United States Patent [19]

Jones et al.

[11] Patent Number: 4,814,934
[45] Date of Patent: Mar. 21, 1989

[54] VOLTAGE FAULT DETECTOR

[75] Inventors: Gregory D. Jones; William R. Owens, both of Rockford; Clifford G. Thiel, Stillman Valley; Clive M. Danby, Rockford, all of Ill.

[73] Assignee: Sundstrand Corp., Rockford, Ill.

[21] Appl. No.: 137,735

[22] Filed: Dec. 24, 1987

[51] Int. Cl.$^4$ .............................................. H02H 3/24
[52] U.S. Cl. ...................... 361/88; 361/91; 361/92
[58] Field of Search ................ 361/86, 88, 90, 91, 361/92; 307/64, 85, 86, 130; 340/660, 661, 662, 663; 331/1 A

[56] References Cited

U.S. PATENT DOCUMENTS

| | | | |
|---|---|---|---|
| 3,337,742 | 8/1967 | Baehr et al. | 307/64 |
| 3,505,598 | 8/1967 | Merrill | 324/77 |
| 4,075,502 | 2/1978 | Walley, Jr. | 307/64 |
| 4,087,697 | 5/1978 | Johnson | 307/66 |
| 4,096,395 | 6/1978 | Bogel et al. | 307/64 |
| 4,156,280 | 5/1979 | Griess | 364/481 |
| 4,219,858 | 8/1980 | DePuy et al. | 361/93 |
| 4,219,860 | 8/1980 | DePuy | 361/94 |
| 4,231,029 | 10/1980 | Johnston | 340/658 |
| 4,356,553 | 10/1982 | Steinle et al. | 364/483 |
| 4,384,213 | 5/1983 | Bogel | 307/64 |
| 4,405,867 | 9/1983 | Moakler et al. | 307/64 |
| 4,423,458 | 12/1983 | Stich | 361/93 |
| 4,446,498 | 5/1984 | Stich | 361/87 |
| 4,475,047 | 10/1984 | Ebert, Jr. | 307/66 |
| 4,520,275 | 5/1985 | Marusik | 307/64 |
| 4,528,458 | 7/1985 | Nelson et al. | 307/64 |
| 4,535,409 | 8/1985 | Jindrick et al. | 364/481 |
| 4,540,892 | 9/1985 | Carvalho | 307/130 |
| 4,583,004 | 4/1986 | Yearsin | 307/64 |
| 4,605,982 | 8/1986 | Harner et al. | 361/94 |
| 4,625,283 | 11/1986 | Hurley | 364/487 |
| 4,628,397 | 12/1986 | Gareis et al. | 361/98 |
| 4,638,175 | 1/1987 | Bradford et al. | 361/90 X |
| 4,677,311 | 6/1987 | Morita | 361/90 X |
| 4,685,020 | 8/1987 | Driscoll et al. | 361/90 X |
| 4,703,191 | 10/1987 | Ferguson | 361/92 X |
| 4,717,984 | 1/1988 | Henry et al. | 361/92 X |

Primary Examiner—A. D. Pellinen
Assistant Examiner—Derek S. Jennings
Attorney, Agent, or Firm—Antonelli, Terry & Wands

[57] ABSTRACT

A voltage fault detector (10) for producing a trip signal causing switching from a first AC voltage source (12) to a second AC voltage source (14) is disclosed. A plurality of comparators (18,20,22) monitor a signal which is proportional to the magnitude of the voltage of a first AC voltage source (12) to determine if sample values fall within predetermined ranges. A counter (30) counts the number of samples falling outside the predetermined range to generate the trip signal when the count reaches a predetermined limit. The counter (30) is augmented for each sample which is outside the predetermined range and decremented for each sample which is within the predetermined range. A plurality of latches (24,26,28) are respectively coupled to a different one of the comparators for applying the output level signal from one of the comparators to the counter at predetermined times under the control of clock signal pulse trains generated by a combinational logic circuit (32) which are respectively applied to a different one of the plurality of latches. The voltage fault detector (10) may be used to monitor the condition of one or more phases of a backup voltage source.

18 Claims, 4 Drawing Sheets

VOLTAGE FAULT DETECTOR

CROSS REFERENCE TO RELATED APPLICATIONS

Reference is made to the following applications which contain subject matter related to the present application and which are incorporated herein by reference in their entirety:
1. $I^2t$ Trip Generator, U.S. patent application Ser. No. 78,366, filed on Apr. 27, 1987.
2. Current Fault Protection System, U.S. patent application ser. No. 137,583, filed on even date herewith.
3. Phase Controller For Processing Current and Voltage Faults, U.S. patent application Ser. No. 137,575, filed on even date herwith.
4. Power Controller, U.S. patent application Ser. No. 137,582, filed on even date herewith.

TECHNICAL FIELD

The present invention relates to voltage fault detectors which control the disconnection of a first voltage source from an electrical load and the connection of a second voltage source to the electrical load upon the detection of a voltage fault in the first voltage source.

BACKGROUND ART

Voltage fault detectors are known which sample an AC voltage source a plurality of times during each cycle. U.S. Pat. No. 4,475,047 discloses a system for disconnecting a first voltage source from a load and connecting a second voltage source to the load upon the detection of a fault condition. The system of U.S. Pat. No. 4,475,047 samples the amplitude of the AC signal from the first voltage source a plurality of times during each cycle. A counter stores a word GOODBD whose cumulative value indicates if the amplitude of the first voltage source is acceptable by counting samples of the AC signal from the first voltage source which are within an acceptable range. A number equal to or greater than 5 indicates that the input AC signal is within acceptable limits. The counter is augmented each time the detection of the sampled waveform within an acceptable range occurs. A further counter counts a word BADCOUNT whose value is used to open a line switch when its cumulative value is equal to zero. BADCOUNT is decremented each time the AC input voltage is found not to be within acceptable limits U.S. Pat. Nos. 3,505,598, 4,087,697, 4,156,280, 4,219,858, 4,219,860, 4,356,553 and 4,423,458 disclose systems for sampling the voltage of AC voltage sources.

U.S. Pat. No. 4,446,498 discloses a system for monitoring current flow to a load which accumulates and decrements a count proportional to current flow for purposes of generating a trip signal when the count reaches a predetermined value.

DISCLOSURE OF THE INVENTION

The present invention provides a voltage fault detector, useful in either single or multiple phase power supplies, which generates a trip signal for disconnecting a first voltage source from a load and connecting a second voltage source to the load upon the detection of a voltage fault in the first voltage source. The voltage fault detector distinguishes between transient conditions in the first voltage source which do not require disconnection and conditions truly indicative of a voltage fault. A voltage which is proportional to the voltage from the first voltage source is compared by a plurality of comparators with different predetermined ranges being used for comparison by each comparator. Each comparator produces an output level signal of a first level when the signal, which is proportional to the signal from the first voltage source, is within a predetermined range and produces the output signal of a second level when the signal is outside the predetermined range. A separate latch is connected between each comparator and a counter which augments its count upon application of a clock pulse to the latch when the output level signal is the second level and decrements its count upon application of a clock pulse to the latch when the output level signal is the first level. Each of the latches is gated by a separate clock pulse train produced by a combinatorial logic circuit which is locked in phase with the first voltage source and switched at a frequency equal to the product of the total number of times the plurality of latches are to be clocked during a full cycle of the first voltage source times the frequency of the first voltage source.

A voltage fault detector for producing a trip signal for causing switching from a first AC voltage source to a second AC voltage source in accordance with the invention includes a plurality of comparators, each comparator producing an output level signal of a first level when a signal which is proportional to a voltage of the first AC voltage source is within a predetermined range and producing the output level signal with a second level when the signal is outside the predetermined range; a plurality of latches, each latch being coupled to the output signal of a different comparator for outputting the level of the output level signal of the comparator to which each latch is coupled in response to a clock signal; a logic circuit for producing a plurality of clock signal pulse trains, equal in number to the number of comparators, locked in phase with the first AC voltage source, a different clock signal pulse train being applied to each of the latches with pulses of each of the clock signal pulse trains being displaced from the pulses of the other clock signal pulse trains; and a counter, responsive to the plurality of latches for augmenting a count each time an output level signal of the second level is received and decrementing the count each time the output level signal of the first level is received, the trip signal being produced when the counter reaches a predetermined count indicative of a voltage fault. Each of the clock signal pulse trains has a plurality of pulses during each cycle of an AC signal from the first voltage source. Each comparator compares the signal which is proportional to the AC signal from the first voltage source with a predetermined range. The predetermined range of each comparator is proportional to sinusoidal values between points in the AC signal at which the output level signal of a comparator is to be applied to the counter to augment or decrement the count. Each of the latches are clocked at a midpoint in the angular range of its associated comparator at which the comparator is to output the output level signal to augment or decrement the count.

In a preferred embodiment of the invention, three comparators are provided. The latch coupled to the first comparator is clocked at 18°, 162°, 198° and 342° of the AC signal from the first voltage source with its range being proportional to sinusoidal values between 0° and 36°. The latch coupled to the second comparator is clocked at 54°, 126°, 234° and 306° of the AC signal from the first voltage source with the range being proportional to sinusoidal values between 36° and 72°. The latch coupled to the third comparator is clocked at 90° and 270° of the AC signal from the first voltage source with the range being proportional to the sinusoidal values between 72° and 108°.

The clock signal source includes a synchronous frequency oscillator producing an output signal having a synchronous frequency equal to the frequency of the AC signal from the first voltage source times the number of times per cycle of the AC signal from the first voltage source that the signal, which is a function of the AC signal from the first voltage source, is to be compared by the plurality of comparators; a combinatorial logic circuit responsive to the synchronous frequency oscillator output signal for producing the plurality of clock signal pulse trains, a comparator for producing a phase control signal at a frequency proportional to the frequency of the AC signal from the first voltage source each time the AC signal from the first voltage source reaches a predetermined angular point; a frequency divider coupled to the output of the synchronous frequency oscillator output signal for dividing the output signal by the number of times per cycle of the AC signal from the first voltage source that the signal, which is proportional to the AC signal from the first voltage source, is compared by the plurality of comparators to produce a divider output signal; and a phase locked loop, coupled to the frequency divider and the comparator, for generating the phase control signal to vary the synchronous frequency of the synchronous frequency oscillator to maintain a fixed phase (0°) between the frequency divider output signal and the phase control signal. A full wave rectifier is coupled to the first AC voltage source for applying a full wave rectification signal from the first AC voltage source to each of the plurality of comparators.

It should be understood that an alternative embodiment of the invention may be used to detect malfunctioning of the phases of the second voltage source when the second voltage source is in a standby condition while not connected to an electrical load.

BEST MODE FOR CARRYING OUT THE INVENTION

Figure 1:
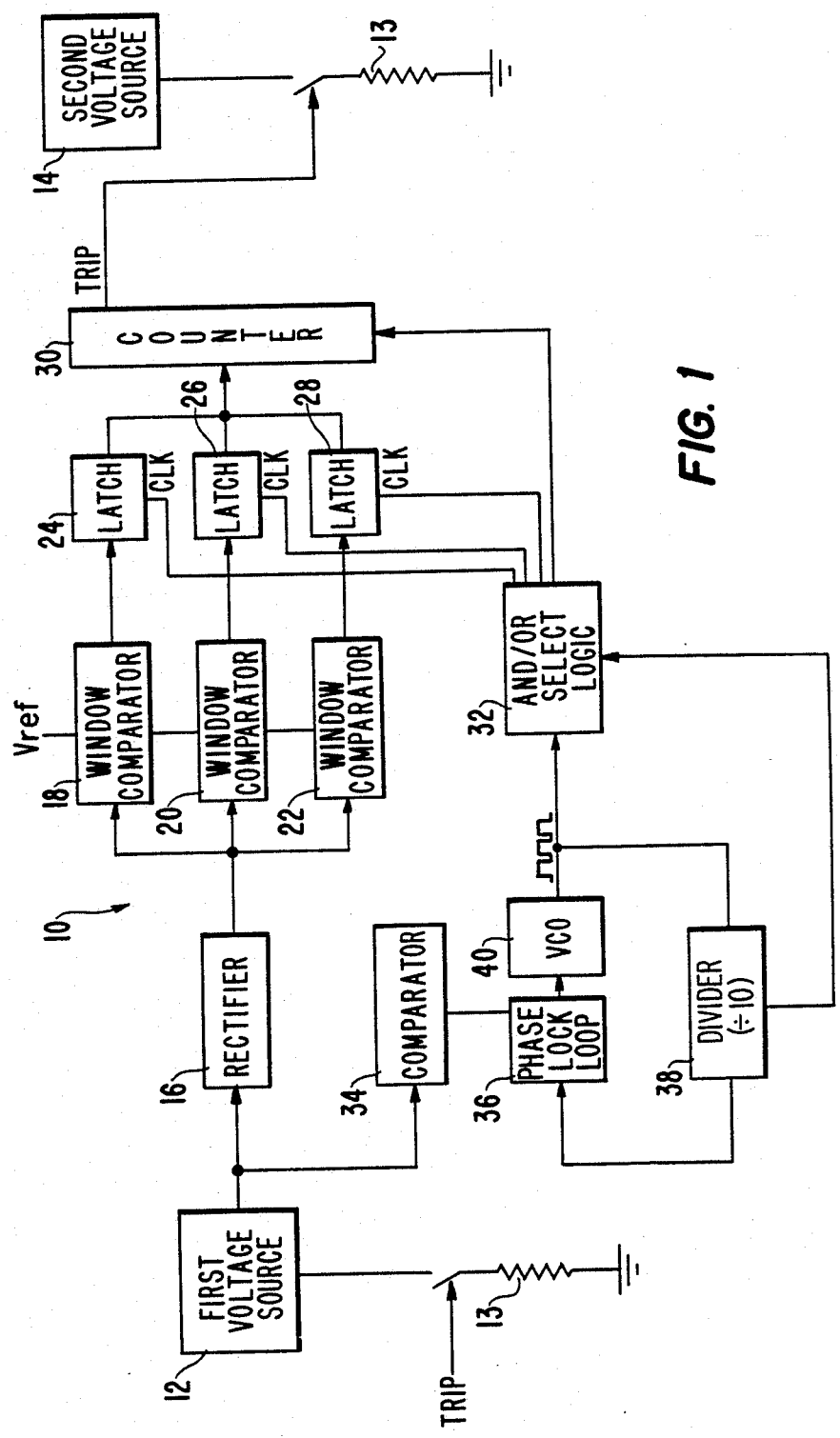
FIG. 1 is a block diagram of a first embodiment of the present invention.

FIG. 1 illustrates a block diagram of a voltage fault detector 10 in accordance with the present invention. The voltage fault detector 10 functions to disconnect a first voltage source 12 from an electrical load 13 and to connect a second voltage source 14 to the electrical load upon the detection of a voltage fault. As will be described in more detail below, the invention monitors a waveform, which is a function of the voltage from the first voltage source to generate a trip signal causing the disconnection of the first voltage source 12 from the electrical load 13 and the connection of the second voltage source 14 to the electrical load upon the detection of a voltage fault. The AC signal from the first voltage source 12 is rectified by rectifier 16 to produce a pulsating waveform having a frequency twice as great as the frequency of the AC signal produced by voltage source 12. While the invention is not limited thereto, a preferred implementation of the present invention is 400 Hz. power supplies used for airframes. A plurality of comparators 18, 20 and 22 each compare the output signal from the rectifier 16 with a predetermined range which is assigned to each comparator. Because of the symmetrical nature of sinusoidal waveforms, each comparator output is stored in a latch which is clocked at a plurality of angular values of the AC signal from the first voltage source 12. While the invention is not limited thereto, the latch 24 may be clocked at 18°, 162°, 198° and 342° of the AC signal from the first voltage source 12; the second latch 26 may be clocked at 54°, 126°, 234° and 306° of the AC signal from the first voltage source; and the third latch 28 may be clocked at 90° and 270° of the AC signal from the first voltage source 12. A sine wave has a constant value for each of the clocking angles of the first, second and third latches which permits a symmetrical single predetermined range of values to be assigned to each of the comparators 18, 20 and 22. Each of the comparators 18, 20 and 22 produces an output level signal of a first level when the output from the rectifier 16 is within a predetermined range assigned to the comparator and a second level when the output from the rectifier is outside the predetermined range. While the invention is not limited thereto, the window for the first comparator 18 may be the range represented by the sine between 0° to 36°; the window for the second comparator may be the range represented by the sine between 36° to 72°; and the window for the third comparator may be the range represented by the sine between 72° and 108°. When the value of the output signal from the rectifier 16 is outside the sine values of a comparator 18, 20 and 22, then the output signal from that comparator has the second level. An up-down counter 30 is coupled to each of the outputs of the latches 24, 26 and 28. The count of the counter is decremented when the output from a latch 24, 26 and 28, which is clocked, applies the output level signal from its associated window comparator 18, 20 or 22 having the first level and is augmented in response to the output level signal being the second level which occurs when the output signal is outside the predetermined range. A trip signal is outputted by the counter 30 when the count reaches a predetermined number. The purpose of the predetermined number is to prevent the disconnection of the first voltage source 12 from the load 13 and the connection of second voltage source 14 to the electrical load respectively in response to transient variations of voltage of the first voltage source. The predetermined number may be set at any non-zero number with the larger the predetermined number the longer the time required to change from the first voltage source 12 to the second voltage source 14.

Figure 2A:
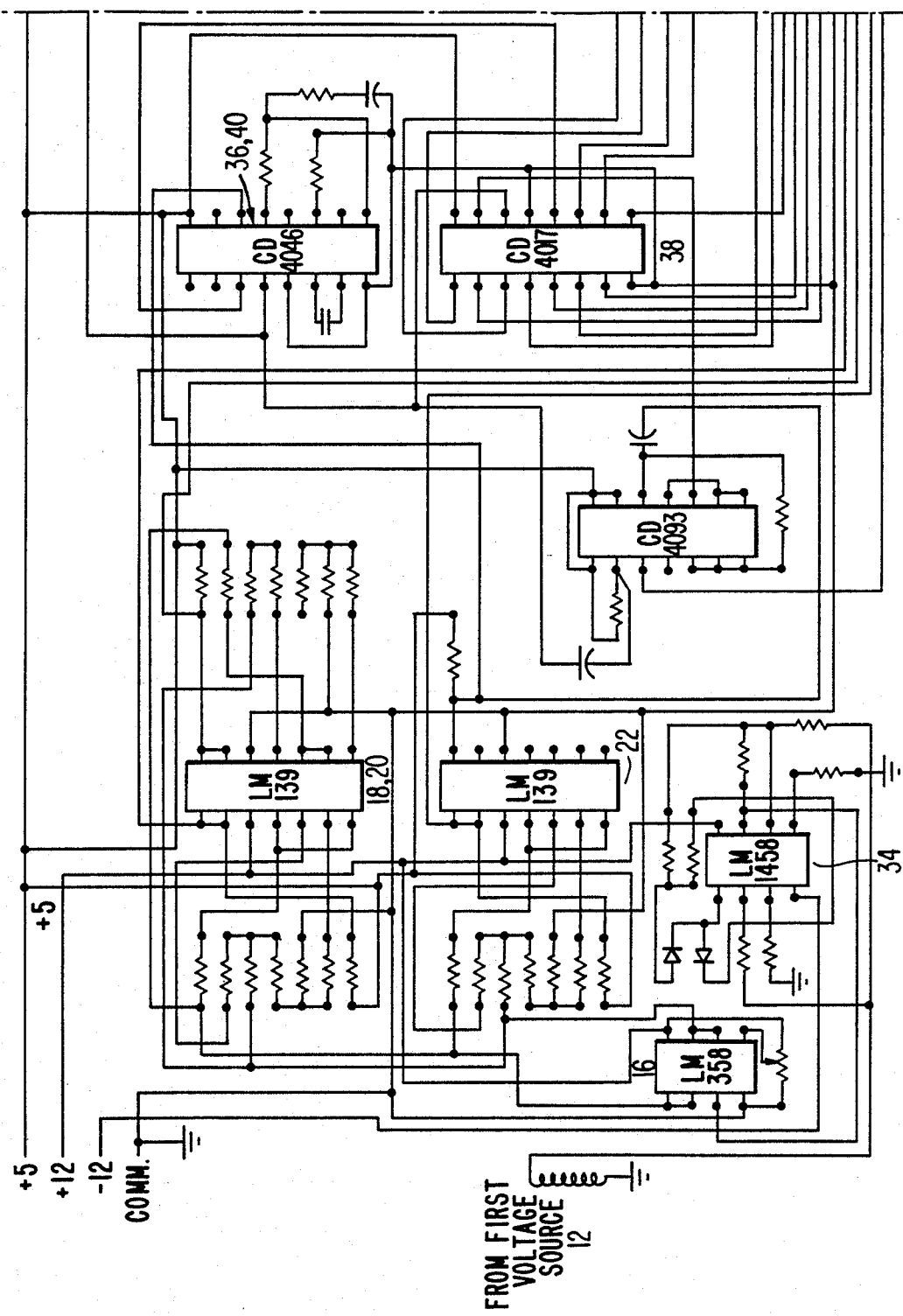
FIGS. 2A and B are an electrical schematic of an implementation of the block diagram of FIG. 1.
Figure 2B:
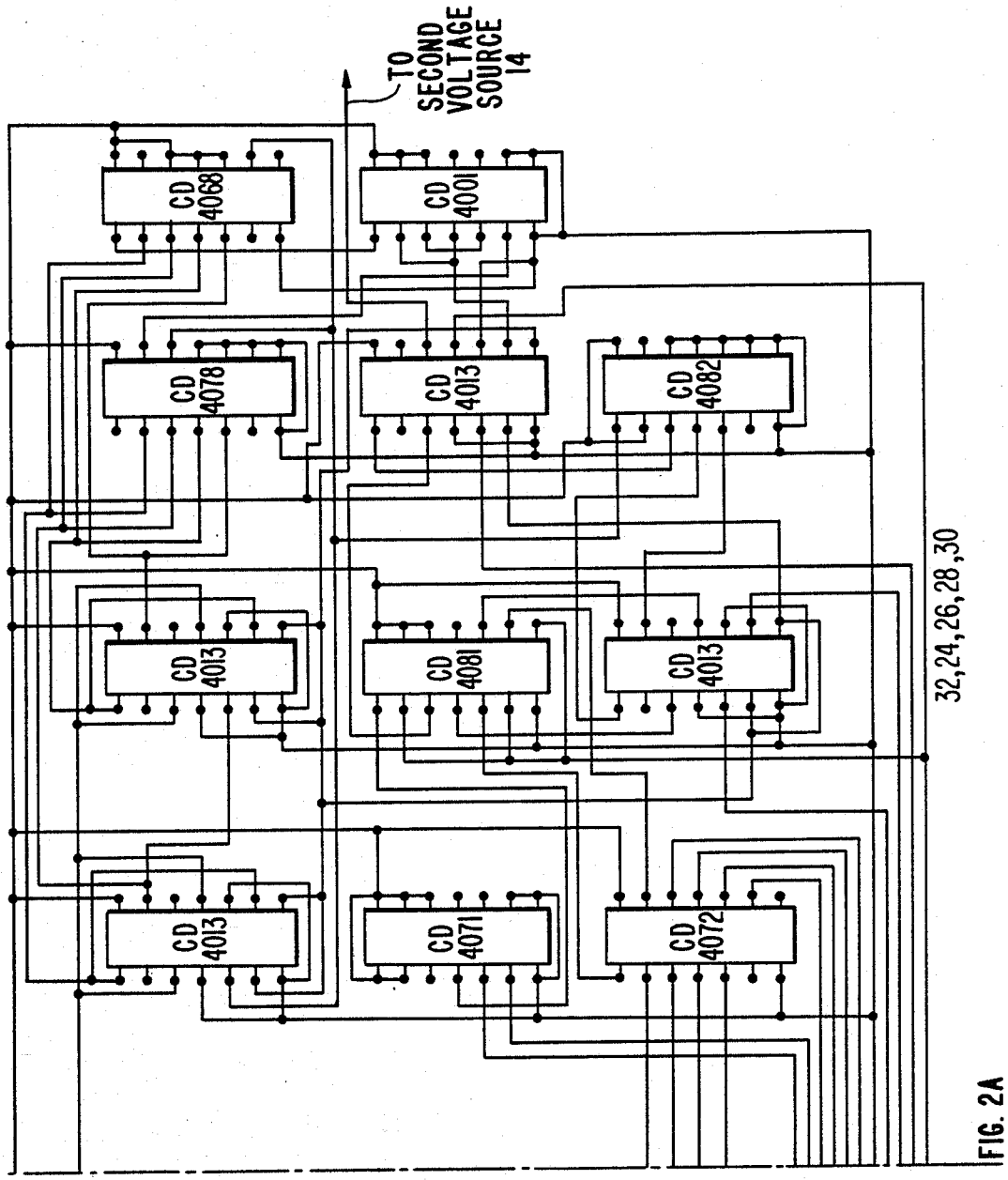

The clock pulses applied to the latches 24, 26 and 28 are produced by a combinational logic circuit 32 which is comprised of a plurality of logic gates which are preferably implemented as by the electrical schematic of FIGS. 2A and 2B. It is important to maintain a fixed phase relationship of the points at which the clock pulses are produced with respect to the AC signal from the first voltage source 12 to insure that the output of the comparators 18, 20 and 22 is truly indicative of the presence or absence of electrical faults. Control of the time during which the clock pulses are applied to the latches 24, 26 and 28 by the combinational logic circuit 32 is controlled by the combination of a comparator 34, which may be a zero crossing detector, that outputs a pulse at a fixed angular point in the cycle of the first voltage source 12 at a frequency equal to the frequency of the first voltage source, a phase locked loop 36, which is responsive to a phase control signal outputted by the comparator 34 and the output from a divider 38 having a frequency equal to the phase control signal produced by the comparator. A synchronous frequency oscillator 40 outputs pulses at a synchronous frequency equal to the product of the frequency of the first voltage source 12 times the number of times during a cycle of the first voltage source that the latches 24, 26 and 28 are clocked. The frequency of the output signal from the synchronous frequency oscillator 40 is varied to maintain a fixed relationship between the output signal from the divider 38 and the signal outputted from the comparator 34. Maintaining of a fixed relationship between these two signals maintains proper synchronism between the clock signal pulse trains and the first voltage source 12.

FIG. 2 illustrates an electrical schematic of an implementation of FIG. 1 without the first voltage source 12 and the second voltage source 14. Conventional integrated circuits are identified by their industry designations. Like parts are identified in FIGS. 1 and 2 by like reference numerals.

Figure 3:
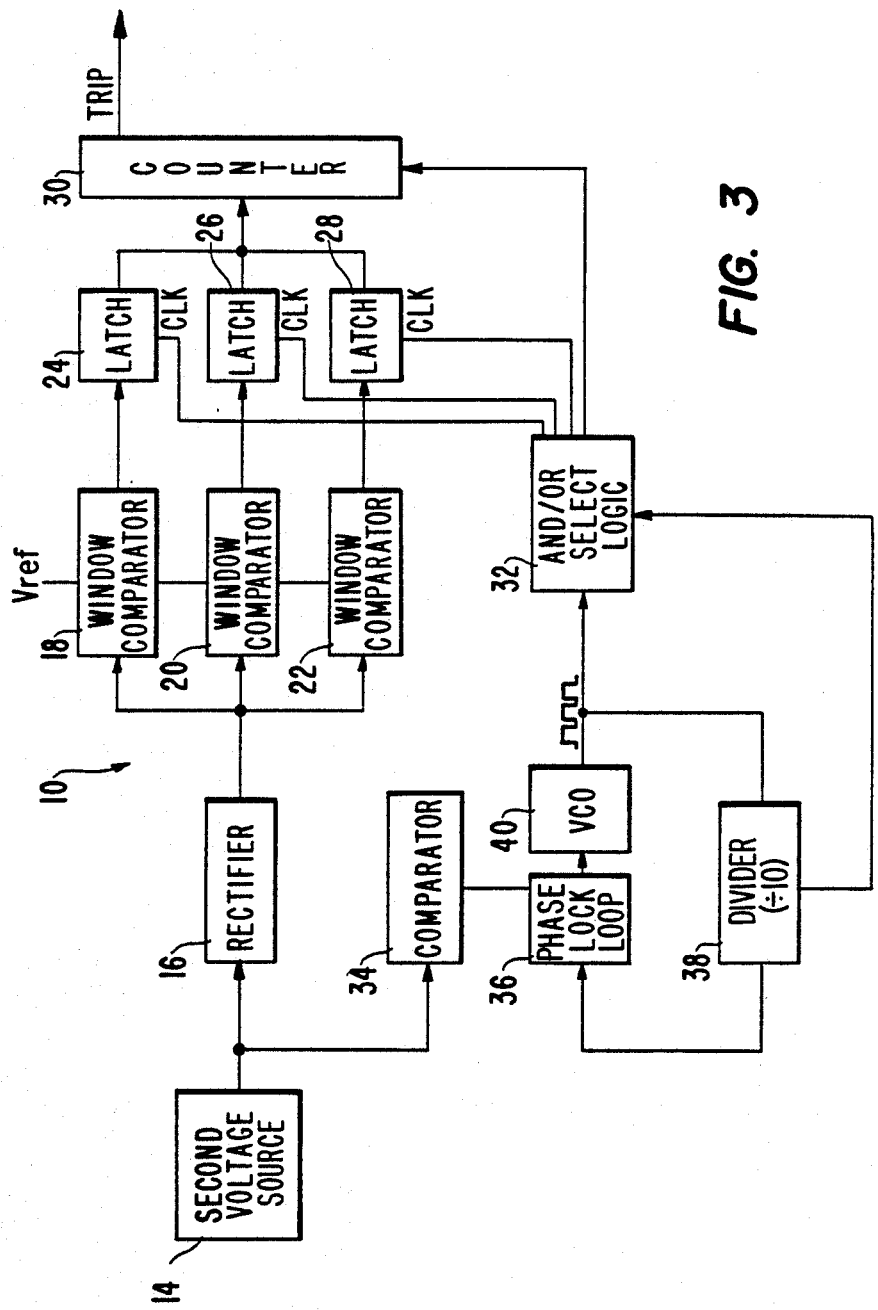
FIG. 3 is a block diagram of a second embodiment of the present invention.

FIG. 3 illustrates a second embodiment of the present invention. Like reference numerals identify like parts in FIGS. 1 and 3. The only difference between FIGS. 1 and 3 is that the embodiment of FIG. 3 functions to monitor the second voltage source 14 and produce a trip signal. The processing of the trip signal from the second voltage source 14 may be in accordance with the above-referenced patent application entitled "Phase Controller For Processing Current and Voltage Faults", U.S. patent application Ser. No. 137,575 filed on even date herewith when the invention is used in a multiphase power supply.

It should be understood that the invention is equally applicable to either single phase or multiple phase power supplies. The invention has been described with reference to a single phase power supply for purposes of ease of understanding but its use in multiple phase power supply systems may be in accordance with the above-referenced patent applications entitled "Phase Controller For Processing Current and Voltage Faults", filed on even date herewith and "Power Controller", U.S. patent application Ser. No. 137,582 filed on even date herewith While the invention has been described in terms of its preferred embodiment, it should be understood that numerous modifications may be made thereto without departing from the spirit and scope of the invention. It is intended that all such modifications fall within the scope of the appended claims.

We claim:

1. A voltage fault detector for producing a trip signal causing switching from a first AC voltage source to a second AC voltage source comprising:
   (a) a plurality of comparators, each comparator producing an output level signal of a first level when a signal, which is proportional to a voltage of the first AC voltage source, is within a predetermined value and producing the output level signal of a second level when the signal is outside the predetermined range;
   (b) a plurality of latches, each latch being coupled to the output signal of a different comparator for outputting the output level signal of the comparator to which each latch is coupled in response to a clock signal;
   (c) means for producing a plurality of clock signal pulse trains, equal in number to the number of comparators, synchronous with the first AC voltage source, a different clock signal pulse train being applied to each of the latches with pulses of each of the clock signal pulse trains being time displaced from the pulses of the other clock signal pulse trains; and
   (d) counting means, responsive to the plurality of latches for augmenting a count each time an output level signal of the second level is received and decrementing the count each time the output level signal of the first level is received, the trip signal being produced when the counting means reaches a predetermined count indicative of a voltage fault.

2. A voltage fault detector in accordance with claim 1 wherein:
   each of the clock signal pulse trains has a plurality of pulses during each cycle of an AC signal from the first voltage source.

3. A voltage fault detector in accordance with claim 2 wherein:
   each comparator compares the signal which is proportional to the AC signal from the first voltage source with a predetermined range of values.

4. A voltage fault detector in accordance with claim 3 wherein:
   the predetermined range of values of each comparator is proportional to sinusoidal values between points in the AC signal from the first voltage source at which the output signal of a comparator is to be applied to the counting means to change the count.

5. A voltage fault detector in accordance with claim 3 wherein:
   each of the latches are clocked at midpoints in an angular range of its associated comparator at which the comparator is to output the output level signal.

6. A voltage fault detector in accordance with claim 3 wherein:
   (a) three comparators are provided;
   (b) the latch coupled to the first comparator is clocked at 18°, 162°, 198° and 342° of the AC signal from the first voltage source with the range of values being proportional to sinusoidal values between 0° and 36°;
   (c) the latch coupled to the second comparator is clocked at 54°, 126°, 234° and 306° of the AC signal from the first voltage source with the range of values being proportional to sinusoidal values between 36° and 72°; and
   (d) the latch coupled to the third comparator is clocked at 90° and 270° of the AC signal from the first voltage source with the range of values being proportional to sinusoidal values between 72° and 108°.

7. A voltage fault detector in accordance with claim 2 wherein the means for producing the clock signal comprises:
   (a) a synchronous frequency oscillator producing an output having a frequency equal to a product of frequency of the AC signal from the first voltage source times the number of times per cycle of the AC signal from the first voltage source that the signal, which is a function of the AC signal from the first voltage source, is to be latched by the plurality of latches; and (b) a logic circuit, responsive to the synchronous frequency oscillator output, for producing the plurality of clock signal pulse trains.

8. A voltage fault detector in accordance with claim 7 further comprising:

(a) means for producing a phase control signal having pulses which occur synchronous with the frequency of the AC signal;

(b) a divider, coupled to the output of the synchronous frequency oscillator, for dividing the output signal by the product of the number of times per cycle of the AC signal from the first voltage source that the signal, which is proportional to the AC signal from the first voltage source, is compared by the plurality of comparators to produce a divider output signal;

(c) a phase locked loop, coupled to the divider and the means for producing the phase control signal, for comparing the phase of the divider output signal and the phase control signal to vary the frequency of the synchronous frequency oscillator to maintain a fixed phase between the divider output signal and the phase control signal.

9. A voltage fault detector in accordance with claim 1 further comprising:

a full wave rectifier, coupled to the first voltage source, for applying a full wave rectification signal from the first voltage source to each of the plurality of comparators.

10. A voltage fault detector for producing a trip signal upon the detection of a fault in an AC voltage source comprising:

(a) a plurality of comparators, each comparator producing an output level signal of a first level when a signal, which is proportional to a voltage of the AC voltage source, is within a predetermined value and producing the output level signal of a second level when the signal is outside the predetermined range;

(b) a plurality of latches, each latch being coupled to the output signal of a different comparator for outputting the output level signal of the comparator to which each latch is coupled in response to clock signal;

(c) means for producing a plurality of clock signal pulse trains, equal in number to the number of comparators, synchronous with the voltage source, a different clock signal pulse train being applied to each of the latches with pulses of each of the clock signal pulse trains being time displaced from the pulses of the other clock signal pulse trains; and (d) counting means, responsive to the plurality of latches for augmenting a count each time an output level signal of the second level is received and decrementing the count each time the output level signal of the first level is received, the trip signal being produced when the counting means reaches a predetermined count indicative of a voltage fault.

11. A voltage fault detector in accordance with claim 10 wherein:

each of the clock signal pulse trains has a plurality of pulses during each cycle of an AC signal from the voltage source.

12. A voltage fault detector in accordance with claim 11 wherein:

each comparator compares the signal which is proportional to an AC signal from the voltage source with a predetermined range of values.

13. A voltage fault detector in accordance with claim 12 wherein:

the predetermined range of values of each comparator is proportional to sinusoidal values between points in the AC signal from the voltage source at which the output signal of a comparator is to be applied to the counting means to change the count.

14. A voltage fault detector in accordance with claim 12 wherein:

each of the latches are clocked at midpoints in an angular range of its associated comparator at which the comparator is to output the output level signal.

15. A voltage fault detector in accordance with claim 12 wherein:

(a) three comparators are provided;

(b) the latch coupled to the first comparator is clocked at 18°, 162°, 198° and 342° of the AC signal from the voltage source with the range of values being proportional to sinusoidal values between 0° and 36°;

(c) the latch coupled to the second comparator is clocked at 54°, 126°, 234° and 306° of the AC signal from the voltage source with the range of values being proportional to sinusoidal values between 36° and 72°; and (d) the latch coupled to the third comparator is clocked at 90° and 270° of the AC signal from the voltage source with the range of values being proportional to sinusoidal values between 72° and 108°.

16. A voltage fault detector in accordance with claim 11 wherein the means for producing the clock signal comprises:

(a) a synchronous frequency oscillator producing an output having a frequency equal to a product of frequency of the AC signal from the voltage source times the number of times per cycle of the AC signal from the voltage source that the signal, which is a function of the AC signal from the voltage source, is to be latched by the plurality of latches; and (b) a logic circuit responsive to the synchronous frequency oscillator output, for producing the plurality of clock signal pulse trains.

17. A voltage fault detector in accordance with claim 16 further comprising:

(a) means for producing a phase control signal having pulses which occur at a frequency of the AC signal at a fixed angular point of the AC signal;

(b) a divider, coupled to the output of the synchronous frequency oscillator, for dividing the output signal by the product of the number of times per cycle of the AC signal from the voltage source that the signal, which is proportional to the AC signal from the voltage source, is compared by the plurality of comparators to produce a divider output signal;

(c) a phase locked loop, coupled to the divider and the means for producing the phase control signal, for comparing the phase of the divider output signal and the phase control signal to vary the frequency of the synchronous frequency oscillator to maintain a fixed phase between the divider output signal and the phase control signal.

18. A voltage fault detector in accordance with claim 10 further comprising:

a full wave rectifier, coupled to the AC signal source, for applying a full wave rectification signal from the AC signal source to each of the plurality of comparators.

* * * * *